Dec. 25, 1923. 1,478,480

C. E. LOWE

MANDREL FOR TIRE TUBES

Filed Aug. 16, 1922

INVENTOR.
Clyde E. Lowe
BY
*Harold Elmo Smith*
ATTORNEY.

Patented Dec. 25, 1923.

1,478,480

UNITED STATES PATENT OFFICE.

CLYDE E. LOWE, OF CLEVELAND, OHIO.

MANDREL FOR TIRE TUBES.

Application filed August 16, 1922. Serial No. 582,117.

*To all whom it may concern:*

Be it known that I, CLYDE E. LOWE, a citizen of the United States, residing at Cleveland, in the county of Cuyahoga and State of Ohio, have invented a certain new and useful Improvement in Mandrels for Tire Tubes, of which the following is a full, clear, and exact description, reference being had to the accompanying drawings.

This invention relates to mandrels for making the inner tubes of pneumatic tires and has particular reference to the marking of said mandrels so as to show on the tube the name or trademark of the manufacturer, the size and quality of the article, or other information. These tubes are ordinarily cured on smooth surfaced metal cores called mandrels, and may be either straight or curved, as desired. Formerly the tubes were marked by printing with rubber stamps, but this requires a separate operation and the mark soon disappears with use. However, the customary mode of curing now employed is to wrap the rubber-covered tube with strips of wet cloth which shrink on drying so as to exert a high degree of curing pressure on the rubber during the curing operation. The tubes are then stripped from the mandrels so as to be turned inside out and exhibit a close copy of the mandrel-surface. An attempt has been made to engrave the desired marks and letters therein by hand, and also to inset engraved plates therein, but such methods are slow, irregular, and expensive. The objects of this invention are the provision of a new, improved and simplified process for engraving these mandrels; the provision of a mandrel of greater uniformity than heretofore; while further objects and advantages of this invention will become apparent as the description proceeds.

Figure 1:
Figure 2:
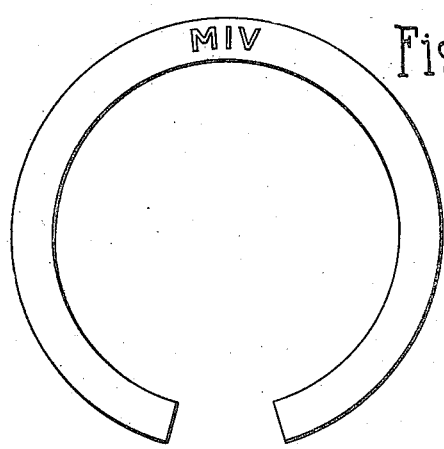
Figure 3:
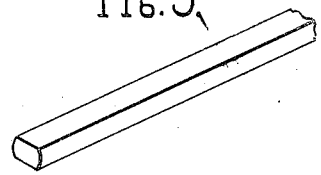
Figure 5:
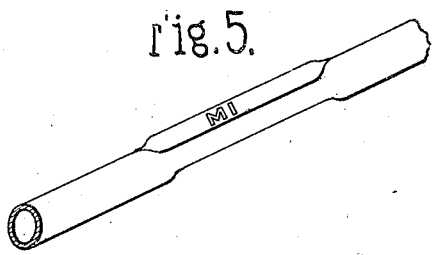
Figure 4:
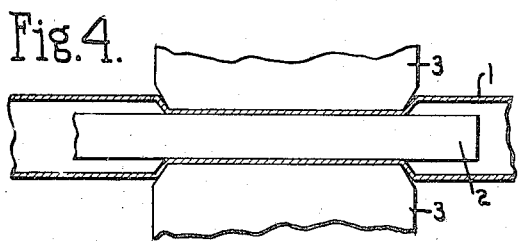
Figure 6:
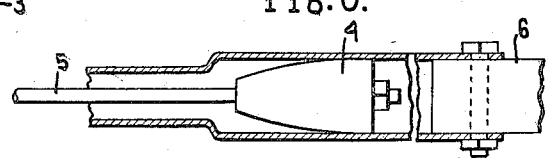
Figure 7:
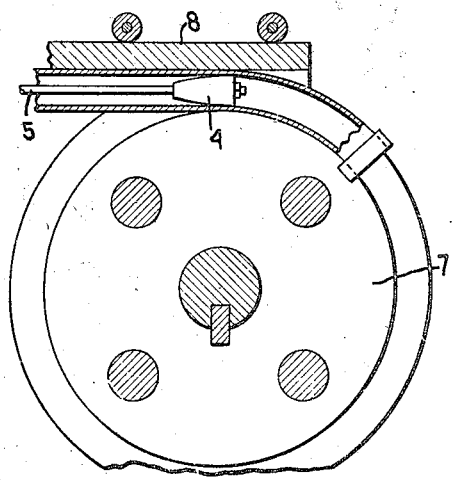
Figure 8:
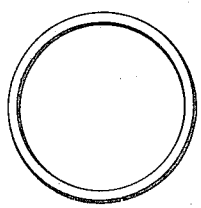
Figure 9:
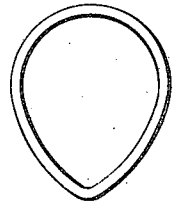

In the drawings accompanying and forming a part of this application, Fig. 1 illustrates a straight mandrel and Fig. 2 a curved mandrel made in accordance with my invention; Fig. 3 is a perspective view of the arbor; Fig. 4 illustrates the crushing operation; Fig. 5 illustrates the lettering operation; and Figs. 6 and 7 illustrate the finishing operation to produce straight and circular mandrels respectively; and Figs. 8 and 9 are end views of finished mandrels.

While I do not confine myself to this material the favorite material for mandrels is seamless tubing, and it has heretofore been very difficult to engrave the same, both because of the rounded, slippery nature of the material and of the lack of any internal support. According to my invention I first introduce into the tube 1 an arbor 2 shown in Fig. 3, preferably having two flat sides, though not necessarily so, for one is sufficient and in some cases other conformations may be employed. I then insert the tube and arbor between the jaws 3 of a suitable press whereby the one is closely pressed into contact with the other.

The desired marks or letters are now impressed into the metal of the tube opposite the arbor as shown in Fig. 5, using a punch press or hydraulic press or other machine of suitable strength. It will be understood that I do not confine myself to making the same one letter at a time since more or less can be made, except that a pressure of about twenty-five tons per inch of letter surface is required and one letter at a time is usually enough.

The arbor is then removed and a spreader or triplet 4 is inserted into the tube and drawn therethrough by the rod 5, the tube being meanwhile held or drawn by a suitable clamp 6, which restores the tube to a uniform cylindrical surface with the letters formed in intaglio. In case a curved mandrel be desired the tube is drawn around a split spool 7 past a longitudinally movable guiding bar 8, a similar triplet 4 and tube 5 being employed.

I do not restrict myself to making mandrels of circular cross section shown in Fig. 8 as it is equally possible to draw the same to any other shape, such as the ovate shown in Fig. 9. Neither do I restrict myself in any other way except as recited in the annexed claims.

Having thus described my invention what I claim is:

1. The process of making a lettered mandrel which contains the steps of flattening a cylindrical blank, impressing therein one or more rubber receiving indentations, constituting identification characters, and finally restoring the flattened portion to a condition of evenness with the surface of adjacent portions of the mandrel.

2. The process of making a lettered mandrel which contains the steps of introducing a flattened arbor into a tubular metallic blank, compressing a portion of said blank into engagement with said arbor, impressing in such portion a series of rubber receiving indentations constituting identification marks, and finally removing the arbor and expanding the flattened portion to an even condition.

3. The process of lettering the exterior of a metal tube which contains the steps of partially collapsing the tube, supporting its walls in such partially collapsed condition, impressing letters in said walls in intaglio while so supported, and afterwards expanding said collapsed portion.

4. The process of making a tube mandrel which contains the steps of partially collapsing a metal tube, supporting its walls in such partially collapsed condition, impressing letters in said walls in intaglio while so supported, and afterwards simultaneously expanding all parts of the tube to an even surface and bending said tube lengthwise to curvilinear form.

5. The process of making a tube mandrel which contains the steps of forming in the tube-surface one or more rubber-receiving impressions in intaglio, each impression being surrounded by a region which is depressed inwardly from the body of the tube, and afterwards expanding all parts of the tube to an even surface.

In testimony whereof, I hereunto affix my signature.

CLYDE E. LOWE.